US012572349B2

(12) United States Patent
Mader et al.

(10) Patent No.: US 12,572,349 B2
(45) Date of Patent: Mar. 10, 2026

(54) COMPUTER-IMPLEMENTED METHOD AND DEVICE FOR THE AUTOMATED UPDATE OF A COMMUNICATION UNIT OF A CONTROL UNIT OF A VEHICLE

(71) Applicant: Vitesco Technologies GmbH, Regensburg (DE)

(72) Inventors: Ralph Mader, Bad Abbach (DE); Rudolf Sieber, Obertraubling (DE); Stefan Kastner, Velburg (DE); Benjamin Kolb, Dornhausen (DE)

(73) Assignee: Vitesco Technologies GmbH, Regensberg (DE)

( * ) Notice: Subject to any disclaimer, the term of this patent is extended or adjusted under 35 U.S.C. 154(b) by 181 days.

(21) Appl. No.: 18/469,119

(22) Filed: Sep. 18, 2023

(65) Prior Publication Data
US 2024/0004640 A1      Jan. 4, 2024

Related U.S. Application Data

(63) Continuation of application No. PCT/EP2021/087341, filed on Dec. 22, 2021.

(30) Foreign Application Priority Data

Mar. 18, 2021    (DE) ........................ 10 2021202658.3

(51) Int. Cl.
G06F 8/65          (2018.01)
H04L 12/40          (2006.01)
(52) U.S. Cl.
CPC .......... G06F 8/65 (2013.01); H04L 12/40006 (2013.01); *H04L 2012/40273* (2013.01)
(58) Field of Classification Search
USPC ........................................................ 717/168
See application file for complete search history.

(56) References Cited

U.S. PATENT DOCUMENTS

2001/0041956 A1* 11/2001 Wong .................. B60R 16/0315
                                                                            718/107
2005/0089065 A1*  4/2005 Hillier ............... H04L 12/40052
                                                                            370/486

(Continued)

FOREIGN PATENT DOCUMENTS

KR        20200072443 A      12/2019
WO        2020070061 A1      4/2020

OTHER PUBLICATIONS

Sven Flake; "What Are Virtual ECUs?"; dspace.com website [full URL included in ref.]; Aug. 22, 2018 (Year: 2018).*

(Continued)

*Primary Examiner* — Yuqing Xiao
*Assistant Examiner* — Clint Thatcher

(57) ABSTRACT

The disclosure relates to a computer-implemented method and device for the automated update of a communication unit of a control unit of a vehicle. The control unit includes a plurality of software clusters. The method includes providing the control unit of the vehicle, comprising a plurality of software clusters, a communication unit and a Multi Device Connector Routine. The communication unit is designed for handling communication between the software clusters and has a dedicated manifest and a configuration table for this purpose. The method includes updating at least one of the software clusters and executing the Multi Device Connector Routine, where at least the manifest of the updated software cluster is read in; at least one new manifest is generated for the communication unit by way of the read-in manifest; and at least one new configuration table is generated for the communication unit.

12 Claims, 3 Drawing Sheets

(56) References Cited

U.S. PATENT DOCUMENTS

| | | | |
|---|---|---|---|
| 2007/0098001 A1* | 5/2007 | Thomas | H04L 49/40 |
| | | | 370/422 |
| 2020/0274927 A1 | 8/2020 | Richmond | |
| 2020/0326931 A1 | 10/2020 | Nadgowda | |
| 2020/0410399 A1* | 12/2020 | Lang | G06N 5/01 |

OTHER PUBLICATIONS

Hung-Manh Pham, Reconfigurable ECU communications in Autosar Environment, 2009 9th International Conference on Intelligent Transport Systems Telecommunications, (ITST), Oct. 20-22, 2009,IEEE Lille France.
Autosar,Layered Software Architecture, R20-11; Link: https://www.autosar.org/fileadmin/user_upload/standards/classic/20-11/AUTOSAR_EXP_LayeredSoftwareArchitecture.pdf, pp. 1-163.
Autosar, Specification of Update and Configuration Management, Document Id. Nr.: 888 Document Status: published Part of Autosar Standard: Adaptive Platform, Release R20-11 pp. 1-134.
Autosar, Explanation of ara:com API,Document Id.Nr.: 846Document Status: Final Part of Autosar Standard: Adaptive Platform Release 17-03 pp. 1-75.
Autosar, Explanation of CP Software Cluster Design and Integration Guideline, Document Status: published Part of Autosar Standard: Classic Platform,Part of Standard Release: R20-11,Document Id. Nr.: 975, pp. 1-182.
International Search Report and Written Opinion dated Apr. 22, 2022 from corresponding International Patent Application No. PCT/EP2021/087341.
German Office Action dated Dec. 6, 2021 for corresponding German Patent Application No. 10 2021 202 658.3.
Korean Office Action dated Feb. 27, 2025 for corresponding German Patent Application No. 10-2023-7031162.

* cited by examiner

COMPUTER-IMPLEMENTED METHOD AND DEVICE FOR THE AUTOMATED UPDATE OF A COMMUNICATION UNIT OF A CONTROL UNIT OF A VEHICLE

CROSS-REFERENCE TO RELATED APPLICATIONS

This application claims the benefit of International Application PCT/EP2021/087341, filed Dec. 22, 2021, which claims priority to German Application 10 2021 202 658.3 filed Mar. 18, 2021. The disclosures of the above applications are incorporated herein by reference.

TECHNICAL FIELD

The disclosure relates to a computer-implemented method and device for automated updating of a communication unit of a control unit of a vehicle. The control unit includes a plurality of software clusters, where each software cluster is an independent software unit having at least one software component, a manifest and a local runtime environment. A software cluster can also be referred to as a PART.

BACKGROUND

Software clusters within a control unit of a vehicle are designed to perform different functions of the control of the vehicle, such as the control of an internal combustion engine or an electric engine or the monitoring of temperatures or the regulation of different variables. Accordingly, a single software cluster performs a specific task within the control unit, where data from the vehicle can be provided to the software cluster for this purpose. In addition, the software cluster can perform calculations using the data provided and in turn make these available to other software clusters for further processing. Accordingly, it is necessary that input data provided to the control unit are made available to the corresponding software clusters, and output data output by the software clusters are provided to the corresponding downstream software clusters or provided to the components of the vehicle for the respective regulation and/or control. For this purpose, the control unit has a communication unit that handles the communication between the software clusters and is also responsible for the corresponding communication of data from outside the control unit.

Within an AUTOSAR environment/architecture, these communication units are conventionally configured manually in such embedded systems. By way of this manual configuration, the interfaces of the individual software clusters to each other and the interfaces with regard to input and output data are configured in such a way that communication between the individual software clusters can be handled during operation of the vehicle or during operation of the control unit.

However, during the operation of the control unit or during the operation of the vehicle, it may be necessary, for example due to changes in legislation, to have to update at least one software cluster or it may be necessary to additionally install a new software cluster on the control unit. In such situations, the communication unit must accordingly be updated for each communication within the software clusters and accordingly also for the communication with the updated or the new software cluster. This update of the communication unit is conventionally performed manually. This manual updating of the communication unit is costly and can be complex due to the increasing complexity of vehicle control units and especially due to increasing updates and changes within the control units.

SUMMARY

Therefore, it is desirable to provide a computer-implemented method and device for enabling automated updating of a communication unit of a control unit of a vehicle.

One aspect of the disclosure provides a computer-implemented method for automated updating of a communication unit of a control unit of a vehicle. The control unit includes a plurality of software clusters, where each software cluster is an independent software unit having at least one software component, a manifest and a local runtime environment. A software cluster is an independent software unit which, for example, executes a control function by way of data from the vehicle or a regulation function, for example, of the drive unit of the vehicle or a computing operation to provide output data, where the software cluster is provided, for example, for controlling the vehicle and/or for regulating a component of the vehicle. The software cluster can also be referred to as a PART. The software component of the software cluster is designed to execute and provide the corresponding functionality. The manifest is a part of an AUTOSAR Classic-compliant implementation that supports the configuration of the AUTOSAR Classic software system and defines the respective software cluster, thereby enabling communication between the software clusters. The local runtime environment of the software cluster provides all the functionalities needed to execute the respective software component.

The method includes providing the control unit of the vehicle. The control unit includes a plurality of software clusters, a communication unit, and a Multi Device Connector Routine. The communication unit is designed for handling communication between the software clusters and has a dedicated manifest and configuration table for this purpose. The control unit provided for the vehicle is accordingly designed to control the vehicle or parts of the vehicle during operation by way of the plurality of software clusters. The communication unit can be used to handle the communication between the individual software clusters. In order to advantageously facilitate communication between the individual software clusters, the communication unit has a dedicated manifest and a configuration table. The corresponding assignment of the individual software clusters to each other and the corresponding data flows is stored in the configuration table. In the AUTOSAR environment, the communication unit can also be referred to as a multi-device bridge. The Multi Device Connector Routine is a software routine that is stored in the control unit, for example in a data processing unit, in a microcontroller.

The method also includes updating at least one of the software clusters, a plurality of the software clusters or adding/removing at least one software cluster. According to this step, the control unit is modified in such a way that one of the software clusters is updated, for example, or a software cluster is added or removed. Due to such a change in the control unit, it is necessary to adapt the communication unit so that after the software cluster has been updated, added or changed, the communication between the software clusters can run smoothly.

The method also includes executing the Multi Device Connector Routine. The Multi Device Connector Routine is a sequencing software that is executed when the control unit is modified to update at least one of the software clusters, update a plurality of the software clusters, or add or remove at least one of the software clusters. The following steps are carried out using the Multi Device Connector Routine:

At least the manifest of the updated software cluster, the updated software clusters or the at least one newly added or the at least one removed software cluster is read in. In some examples, all manifests or some of the manifests of the software clusters of the control unit can also be read in.

At least one new manifest is generated for the communication unit by way of the at least one read-in manifest. In this method step, the Multi Device Connector Routine generates a new manifest for the communication unit, where the information from the read-in manifests, or from at least one read-in manifest, is used. In doing so, the newly added information from the new software cluster can be used for the communication unit or for the configuration of the communication unit.

At least one new configuration table is generated for the communication unit. Similar to the previous step, in addition to the new manifest for the communication unit, the corresponding configuration table for the communication unit is also regenerated so that the new information supplied to the control unit with the change of the new software cluster can be mapped within the configuration table so that the communication via the communication unit can be carried out by way of the new manifest and by the new configuration table.

Flashing the at least one new manifest and the at least one new configuration table, thereby updating the communication unit of the control unit of the vehicle. The Multi Device Connector Routine, which is executed in the bootloader of the control unit, for example, can accordingly automatedly update the communication unit by way of the disclosed steps, so that this no longer has to be performed manually. If a new software cluster is added to the control unit, the Multi Device Connector Routine is then automatedly executed, whereby the communication unit of the control unit is automatedly updated so that the communication handling between the various software clusters can be advantageously restored quickly and easily with the new software cluster, so that downtimes can be significantly reduced. As such, it is no longer necessary to manually reconfigure the corresponding communication unit. Accordingly, the automated updating enables advantageously fast and independent updating of the communication unit.

In some implementations, the control unit includes a plurality of virtual control units. Each of the virtual control units in each case includes a plurality of software clusters and a dedicated communication unit. The architecture of the control unit is such that at least two virtual control units form the control unit. In this example, the communication between the software clusters within the dedicated virtual control unit and the communication between the software clusters of the different virtual control units is handled by way of the communication units. In other words, the individual software clusters of each individual virtual control unit can communicate with each other via the respective virtual control unit's dedicated corresponding communication unit and, in addition, the software clusters of the various virtual control units can communicate by way of the respective communication units.

In some examples, a software cluster needs information from another software cluster from another virtual control unit. Accordingly, communication between these software clusters must be handled via the communication units of the corresponding virtual control units. At least one of the communication units may be updated during the execution of the Multi Device Connector Routine. In some examples, when the Multi Device Connector Routine is executed, all communication units of the control unit are updated, i.e., each communication unit of each virtual control unit. If, for example, a software cluster of a virtual control unit is updated, then the Multi Device Connector Routine is automatedly executed so that at least the communication unit of the corresponding virtual control unit is also updated due to the update of the software cluster, so that communication within the virtual control unit can take place again as usual. If, for example, the newly updated software cluster uses other software clusters that are stored in another virtual control unit, then it may also be necessary to additionally also update the communication units of the other virtual control unit due to the update of a software cluster of the other virtual control unit. Accordingly, the updating of the communication units would be adapted depending on the updated software cluster or depending on an added or deleted software cluster, so that all necessary communication units are updated in each case, so that subsequently the entire communication within the control unit can be advantageously carried out again. Using the Multi Device Connector Routine, this can be done completely automatedly, so that no manual configuration of the communication unit is necessary due to an update of a software cluster. Accordingly, downtimes and costs can be saved.

In some implementations, the control unit includes a shared memory and the communication between the software clusters of the different virtual control units by way of the communication units is handled via the shared memory. The shared memory serves as a common memory for the different virtual control units. The execution of the Multi Device Connector Routine may also be handled via the shared memory. The shared memory provides an advantageously simple, robust and fast solution to handle the communication between the different virtual control units and also to execute the Multi Device Connector Routine to update the communication units advantageously quickly and easily.

In some, the control unit is formed by a plurality of microcontrollers each forming a part of the control unit and including respectively at least a plurality of the software clusters and respectively the communication unit, where the communication between the software clusters within the respective microcontrollers and between the software clusters of the different microcontrollers is handled by way of the communication units, where by way of executing the Multi Device Connector Routine at least one of the communication units is updated. A control unit may include several microcontrollers. For example, one microcontroller is designed to control a certain area of the vehicle and the other microcontroller is designed to control another area of the vehicle. Nevertheless, it may be necessary for the microcontrollers to communicate with each other in order to exchange data or information. Accordingly, the respective microcontrollers each have a plurality of software clusters, which accordingly communicate with each other in the respective microcontroller by way of the communication unit and additionally communicate between the software clusters of the respective microcontrollers by way of the respective communication units. Accordingly, if, for example, a software cluster of a microcontroller is exchanged, updated or deleted or added, the respective communication unit of the corresponding microcontroller must be updated by way of the Multi Device Connector Routine. If, for example, the updated software cluster additionally also requires information from the additional microcontroller or is designed to communicate with at least one software cluster of the additional microcontroller, then it may be necessary to additionally also update the communication unit of the additional microcontroller or microcontrollers. This would accordingly also be done using the Multi Device Connector Routine. The corresponding automated update of the communication units can accordingly be carried out depending on the added software cluster or the updated software cluster or software clusters.

In some implementations, each of the microcontrollers includes a respective Multi Device Connector Routine, where by way of executing the respective Multi Device Connector Routine at least one of the communication units of the corresponding microcontroller is updated. The respective Multi Device Connector Routine can be executed in the respective bootloaders of the microcontroller. Each of the microcontrollers may, for example, additionally have a plurality of virtual control units, each of which in turn has a communication unit for communicating the respective software clusters. Accordingly, by way of the Multi Device Connector Routine, the respective communication unit can be automatedly updated depending on the updated or changed software cluster. The bootloader is used to update the software code in the flash memory. The update takes place in the flash memory of the respective microcontroller, which can only be accessed from the respective microcontroller. This is why each microcontroller has a dedicated bootloader and accordingly the Multi Device Connector Routine is executed in each bootloader.

In some implementations, the microcontrollers are connected to each other by way of a high speed serial link (HS SL), a LAN connection or a bus system and the communication between the software clusters of the different microcontrollers is handled by the communication units via the high speed serial link, the LAN connection or the bus system. The high speed serial link, the LAN connection or the bus systems provide an advantageously reliable, robust and fast connection for the necessary communication between the microcontrollers, so that the control unit can advantageously robustly control the vehicle. The execution of the at least one Multi Device Connector Routine is additionally handled via the high speed serial links, the LAN connection or the bus system, if the execution of the Multi Device Connector Routine requires the adaptation of a communication unit located on one of the other microcontrollers.

In some implementations, the control unit includes an over-the-air interface, where data are provided to the control unit by way of the over-the-air interface, where updating at least one of the software clusters, a plurality of the software clusters or adding/removing at least one of the software clusters is performed by way of the data provided thereby.

In some examples, the control unit itself does not have the over-the-air interface, but the data are provided to the control unit by way of an over-the-air interface of, for example, another device. By way of the over-the-air interface, data can, for example, be transmitted to the control unit by way of a W-LAN connection or by way of a mobile phone network. In some examples, the manufacturer of a vehicle or the manufacturer of the control unit would like to update the corresponding control unit, for example by adding a new software cluster to the control unit. This software cluster can accordingly be supplied to the control unit by way of the corresponding over-the-air interface, whereby the software cluster is integrated into the control unit. Accordingly, the addition of the software cluster via the over-the-air interface may subsequently trigger the execution of the Multi Device Connector Routine, thereby updating the communication unit of the control unit. A user of the control unit or a user of the vehicle would accordingly not notice any change in the control unit or there would be no change in the driving behavior of the vehicle, since the control unit can be updated in the background, for example.

In some implementations, updating at least one of the software clusters, a plurality of the software clusters or adding/removing at least one software cluster and/or executing the Multi Device Connector Routine is performed in dependence on safety/security-relevant and/or time-relevant events. In other words, the updating of the communication unit or the addition or modification of one of the software clusters is only carried out if the situation in which the control unit or the vehicle is located allows this. For example, if the vehicle is in operation or the control unit is in operation or, in particular, in a critical or highly relevant state, then the update of a software cluster or an update of the communication unit should be avoided so that the vehicle or the control unit can continue to be operated without restriction. Consequently, it may be first queried whether the control unit is in a safety/security-relevant or time-relevant state, or that such events are imminent, before a software cluster is updated or added or removed and the corresponding Multi Device Connector Routine for updating the communication unit is executed. This makes it possible to ensure that the control unit can perform all driving situations and at the same time the updating of the control unit is performed when the control unit is in a corresponding mode. This allows safety/security-critical requirements to be advantageously met easily and accurately, while at the same time automatedly updating the control unit by updating, adding or removing at least one of the software clusters and accordingly automatedly updating the communication unit.

In some implementations, the communication unit is updated depending on a safety level and/or a security level. In some examples, the updating of a part of the communication unit takes place depending on a safety level and/or a security level. The safety level, for example, is an automotive safety integrity level. According to these examples, the communication within the control unit necessary for updating the communication unit can be divided into safety relevant parts and non-safety relevant parts or into security relevant parts and non-security relevant parts. Accordingly, those parts that have the highest safety/security requirements can be processed first.

The division of the communication parts into safety (ASIL) relevant parts and non-safety parts should still be listed as a subclaim. The same for security-relevant parts.

In some implementations, components of a device are controlled and/or input data from sensors of the device are evaluated by way of the software clusters. In some examples, it is also conceivable that software clusters or one of the software clusters further processes data from another software cluster, generates output data therefrom, which in turn are used to control a component within the device. Accordingly, the software clusters take over control or regulation tasks in order to control the device as intended within the embedded system.

In some implementations, by way of the device, a vehicle, such as a drive train of the vehicle or a part of the vehicle, for example a part of a drive train of the vehicle, is controlled, and/or the input data from the sensors of the vehicle, such as of the drive train, are evaluated by way of the software clusters of the control unit. In other words, the software clusters of the control unit are intended to control a drive train, for example a hybrid drive train or a fully electrified drive train of a vehicle, or to evaluate sensor data from sensors of the drive train and, for example, to provide data to the driver of a corresponding vehicle or, by way of the input data from the sensors, to determine output data in turn, which are provided in the drive train for corresponding control or regulation.

In some implementations, the control unit has a frozen software cluster as at least one of the software clusters. The frozen software cluster differs from the other software clusters in that it is classified as "frozen" and cannot be changed. In some examples, such frozen software clusters are designed to execute high-safety/security relevant functions or similar. Accordingly, such software clusters cannot be changed or removed. Furthermore, in some examples, the Multi Device Connector Routine takes these software clusters into account by not updating or changing their communication interfaces within the communication unit.

Another aspect of the disclosure provides a control unit designed to automatedly update a communication unit of the control unit, where the control unit includes a plurality of software clusters. Each software cluster is an independent software unit including at least one software component, a manifest and a local runtime environment, where the communication unit is designed for handling communication between the software clusters and includes a dedicated manifest for this purpose, where the control unit is designed to perform one of the aforementioned methods. Another aspect of the disclosure provides a vehicle that includes the control unit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
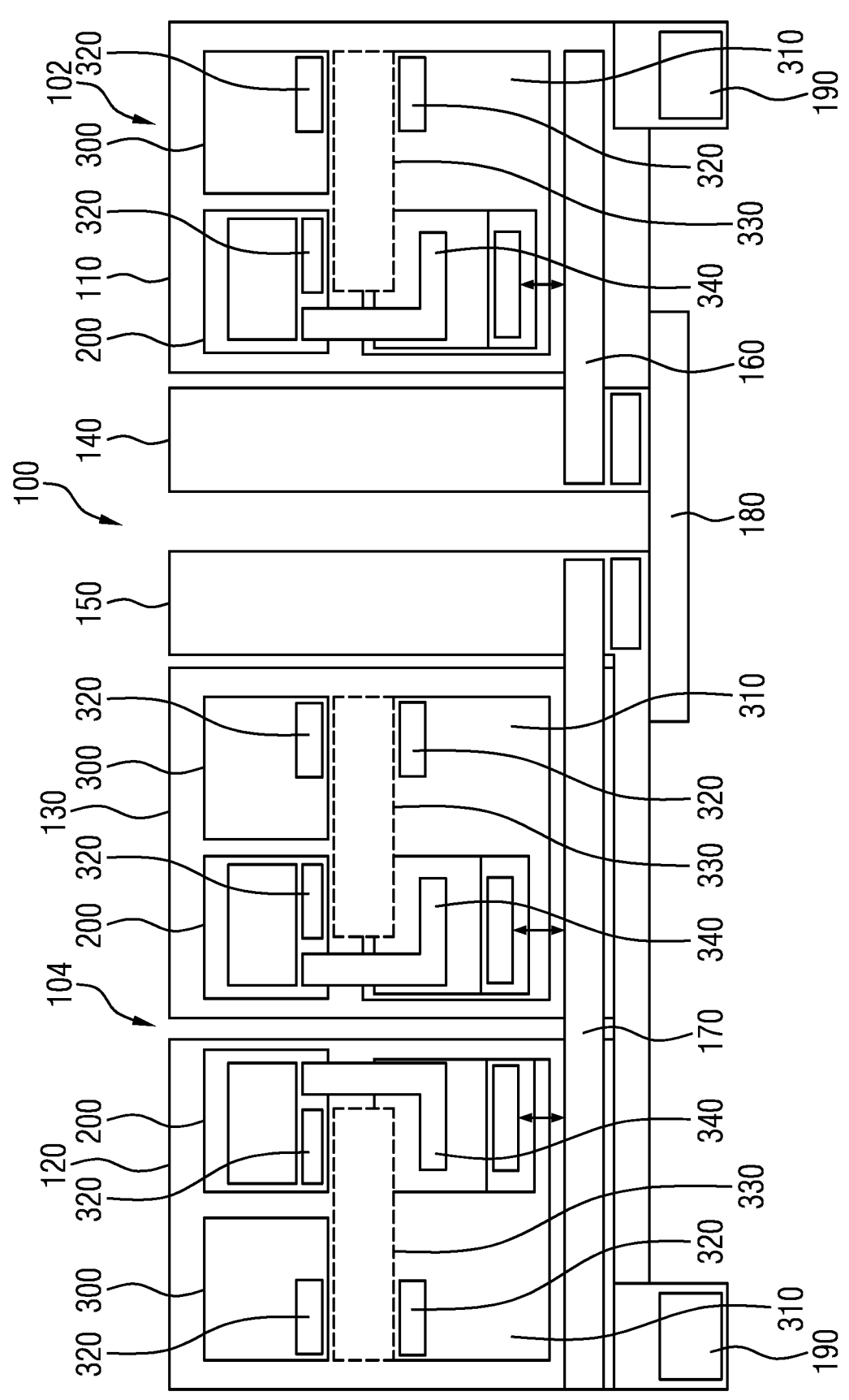
FIG. 1 shows a schematic representation of an architecture of a control unit.

FIG. 1 shows a control unit 100. The control unit 100 includes a first microcontroller 102 and a second microcontroller 104. In some examples, the control unit 100 includes further microcontrollers. The first microcontroller 102 and the second microcontroller 104 are interconnected by way of a high speed serial link (HSSL) 180. The communication between the first microcontroller 102 and the second microcontroller 104 takes place by way of the high speed serial link 180. The first microcontroller 102 includes a first virtual control unit 110. The second microcontroller 104 includes a second virtual control unit 120 and a third virtual control unit 130. Accordingly, the second microcontroller 104 has a plurality of virtual control units, while the first microcontroller 102 has only a single virtual control unit 110. The first microcontroller 102 further includes a first virtual control unit manager 140. The second microcontroller 104 also has a second control unit manager 150. The virtual control unit managers 140, 150 are configured to control the power-up and power-down of the virtual control units 110, 120. In addition, the control unit managers 140, 150 are linked to each other as masters by way of shared resources, in this case by way of the HSSL interface, whereby the accesses to the virtual control units 110, 120 are managed.

The first microcontroller 102 has a first memory 160. The second microcontroller 104 has a second shared memory 170, wherein the second virtual control unit 120 and the third virtual control unit 130 share the second shared memory 170 as a shared memory. Accordingly, communication between the second virtual control unit 120 and the third virtual control unit 130 takes place via the second shared memory 170. The first microcontroller 102 and the second microcontroller 104 each store a Multi Device Connector Routine 190 that can be executed by way of a bootloader. Each virtual control unit 110, 120, 130 has a respective communication unit 200. Each of the communication units 200 has a dedicated manifest 320 and configuration table. The communication units 200 are each provided for handling communication within the respective virtual control units 110, 120, 130 and additionally for handling communication between the respective virtual control units 110, 120 and 130. Each of the virtual control units 110, 120, 130 further includes a plurality of software clusters 300. Each software cluster 300 is an independent software unit that has at least one software component, a manifest and a local runtime environment. The software cluster 300 can also be referred to as a PART. Each software cluster 300 is designed to map or execute a corresponding functionality of the control unit 100, for example for controlling a drive train of a vehicle. Each virtual control unit 110, 120, 130 also has a host software cluster 310. The host software clusters 310 provide the basic software (e.g.: OS tasks, communication stacks, central error memory, etc.) for the software clusters 300 of the virtual control units 110, 120 and 130. Each of the virtual control units 110, 120, 130 also includes an AR Flex Layer 330 and a Protocol Data Unit Router 340. The AR Flex Layer 330 is the connection via the manifest between the software clusters 300. The Protocol Data Unit Router 340 is designed to distribute the communication packets (PDUs) to the different buses (CAN, LIN, Ethernet) including shared memory and HSSL.

For example, if a software cluster 300 within the first virtual control unit 110 is updated or a new software cluster 300 is added within the first virtual control unit 110, then the Multi Device Connector Routine 190 is accordingly executed using a bootloader of the first microcontroller 102, thereby automatedly updating the communication unit 200 of the first virtual control unit 110 so that communication can be handled within the first virtual control unit 110. For example, if this updated software cluster 300 additionally interfaces with other software clusters 300 in the second microcontroller 104, such as a software cluster 300 within the second virtual control unit 120 of the second microcontroller 102, then it may be necessary to additionally also update the communication unit 200 of this virtual control unit 120. Accordingly, the Multi Device Connector Routine 190 of the second microcontroller 104 is executed in the corresponding bootloader of the second microcontroller 104 so that the communication unit 200 of the second virtual control unit 120 is additionally updated. Accordingly, all relevant communication units 200 of the control unit 100 can be updated so that the entire handling of communication within the control unit 100 can again be advantageously robust without the need to redefine and update manual communication interfaces.

Figure 2:
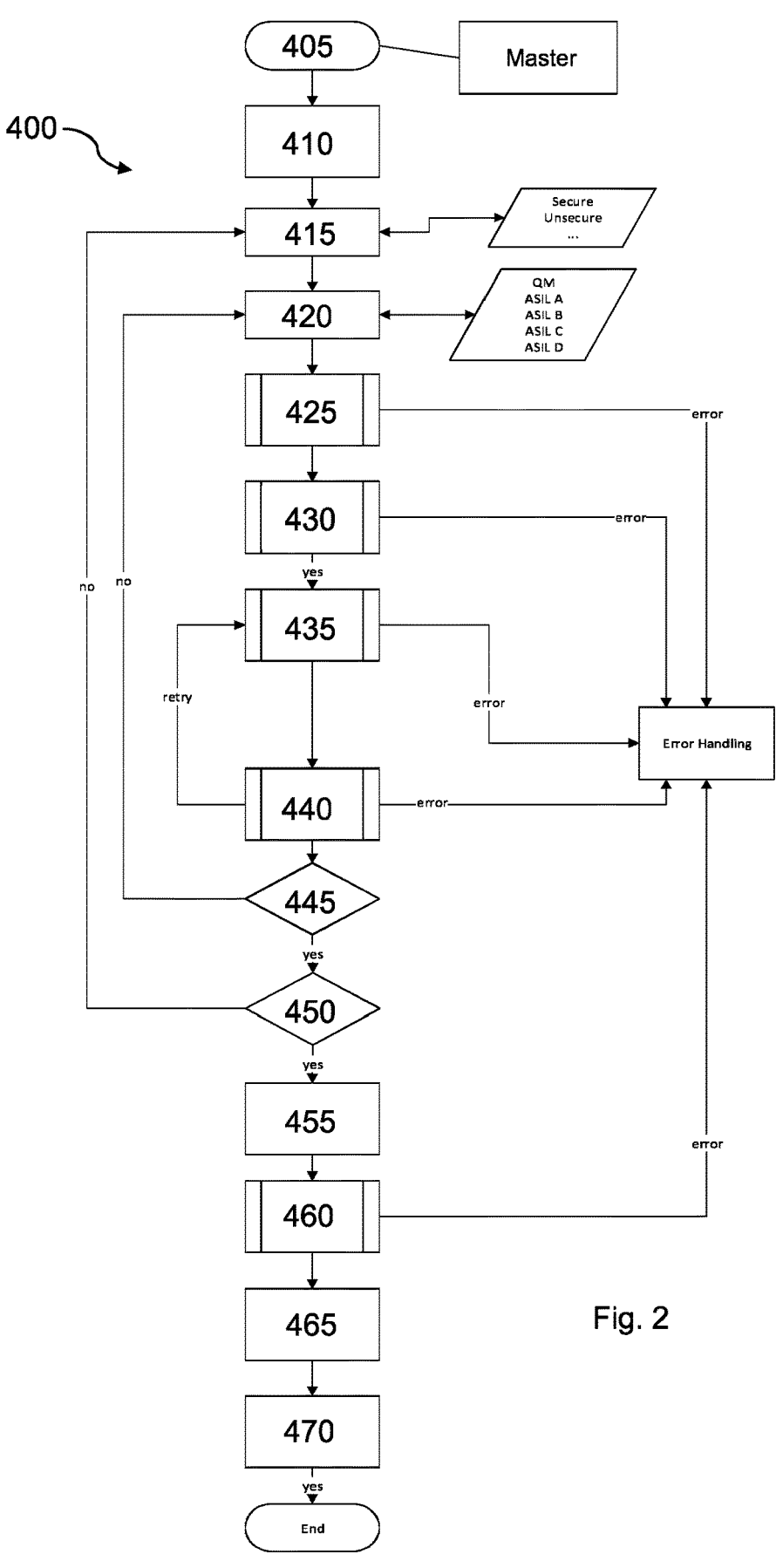
FIG. 2 shows an exemplary first flowchart of the multi device connector in the master role.

FIG. 2 shows a first flowchart 400 illustrating the execution of the Multi Device Connector Routine 190 in a virtual control unit 110, 120, 130 in which a software cluster 300 has been updated. Accordingly, the Multi Device Connector Routine 190 is executed in the master role, i.e., execution in the microcontroller in which at least one virtual control unit 110, 120, 130 has undergone an update of at least one software cluster 300. The start of the flowchart 400 is shown with the start block 405. In the first step 410, the configuration tables stored in the flash are made available in RAM. The processing then takes place depending on the Safety Integrity Level (QM-ASIL-D) and the Security Level (Secure/Unsecure). This is shown schematically by way of the second step 415, the third step 420, the eighth step 445 and the ninth step 450. The query is carried out by way of loops that run through the different Safety Levels/Security Levels. This is also shown schematically in the flowchart 400. Then, in the fourth step 425, manifest information is requested from other virtual control units. Then, in the fifth step 430, the protocol data unit payload structure is calculated.

The payload of the protocol data units is determined as follows: First, a list of transmission data to be sent to another virtual control unit is generated. Subsequently, for each pre-configured PDU of the category transmit, receive, time grid, Safety Integrity Level, Security Level, it is first checked in the list of transmission data whether this matches the PDU category, if so and this is not the first entry of the payload table, the entry is moved from the transmission data list to the transmit PDU payload table, if not, it is stored that at least one entry exists in the payload table for this PDU category. If the pre-configured payload area of a PDU is filled with transmission data, the system switches to the next pre-configured PDU of the same category and the filling method continues. The method is repeated until all data to be sent are distributed to PDUs or the method is terminated with an error code, if the pre-configured payload range of the PDUs is exhausted but there is still more transmission data to be distributed to PDUs. This determines the PDU payload structure.

Then, in the sixth step 435, the determined PDU payload structure is exchanged with the other virtual control units 110, 120, 130. Subsequently, in the seventh step 440, a PDU payload configuration check is performed across all virtual control units 110, 120, 130. If an error has occurred in one of the preceding steps, error handling is triggered that repeats the method up to a maximum error tolerance threshold. If there are no errors, the manifest of the Multi Device Bridge is then calculated in the eleventh step 460 and twelfth step 465, after waiting for possible slaves (tenth step 455). All data sent by the Multi Device Bridge become "required ports" and all data received by the Multi Device Bridge become "provided ports" of the manifest. After the manifest of the Multi Device Bridge is computed and persisted in the flash memory, the connection process for manifests of all software clusters 300 of the virtual control unit is initiated; this is schematically shown in the flowchart 400 in the thirteenth step 470. Then the first flowchart 400 ends.

Figure 3:
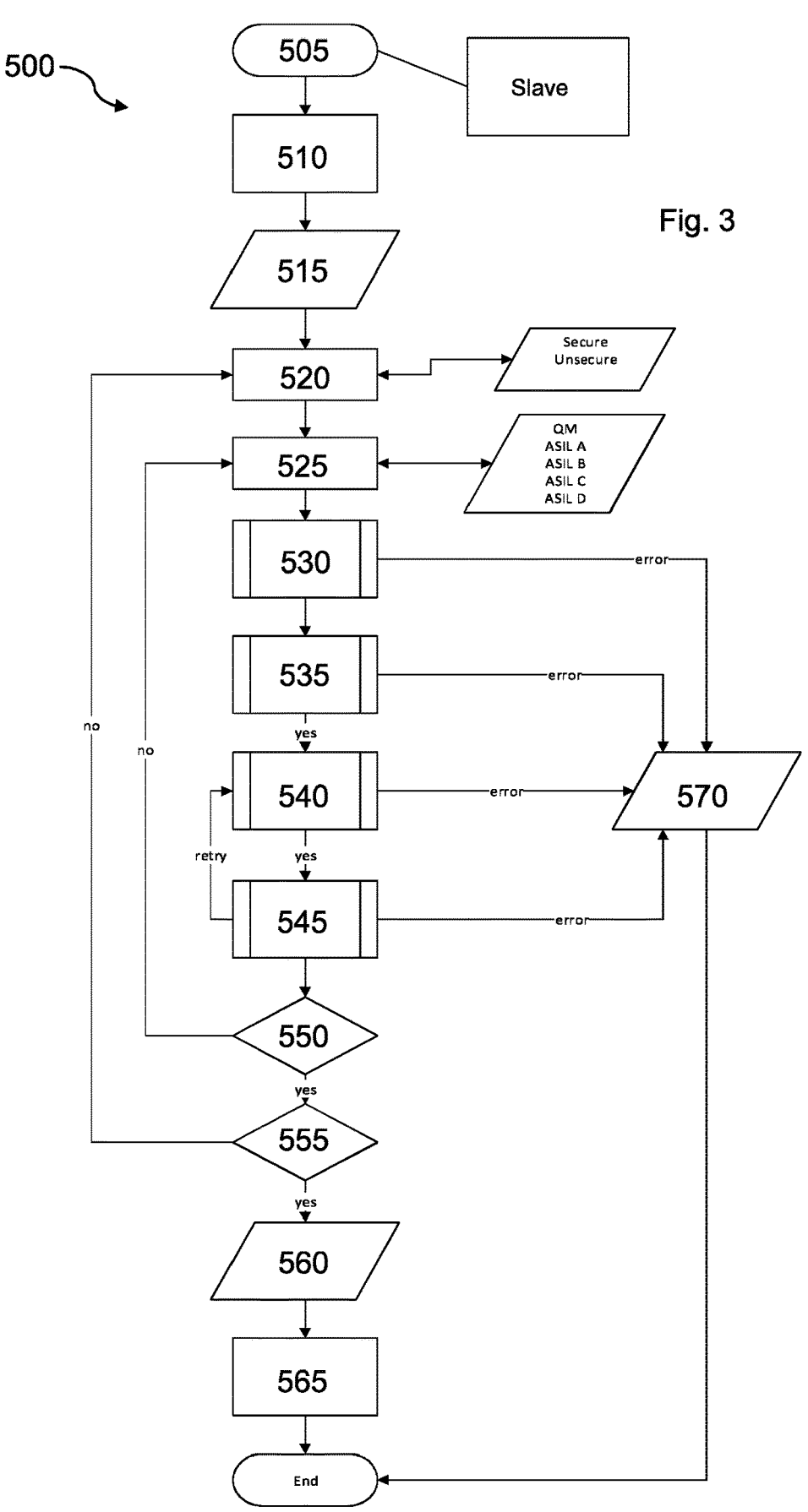
FIG. 3 shows an exemplary second flowchart of the multi device connector in the slave role.

FIG. 3 shows a second flowchart 500 illustrating the execution of the Multi Device Connector Routine 190 in a virtual control unit 110, 120, 130 in which none of the software clusters 300 have been updated. The Multi Device Connector Routine 190 is accordingly executed in the slave role, i.e., execution in the microcontroller that has not been updated. The procedure is identical to that shown in FIG. 2. The master controls the flow control, the error handling and the initiation of the manifest creation. The slave reacts to this by setting its state machine accordingly. The start of the second flowchart 500 is shown schematically with the start block 505. Slave mode starts when the microcontroller itself is not master and receives a corresponding request from another microcontroller. In the first step 510, the configuration tables stored in the flash are made available in RAM. Subsequently, the configuration status is set to 2; this is shown in the second step 515. This means that processing is started on the slave side. Processing then takes place depending on the Safety Integrity Level (QM-ASIL-D) and the Security Level (Secure/Unsecure). This is shown schematically by way of the third step 520, the fourth step 525, the ninth step 550 and the tenth step 555. Manifest information is then requested from other microcontrollers; this is shown schematically by way of the fifth step 530. Then, in the sixth step 535, the protocol data unit payload structure is calculated. Subsequently, in the seventh step 540, the determined PDU payload structure is exchanged with the other virtual control units 110, 120, 130. Then, in the eighth step 545, a PDU payload configuration check is performed across all virtual control units 110, 120, 130. In the event of an error, the configuration status is set to 0; this is shown schematically in block 570, which indicates that the processing on the slave side has ended with an error. If everything was carried out without errors, the configuration status is set to 1, indicating that the processing on the slave side has been successfully completed. This is shown in the flowchart 500 with the eleventh step 560, whereupon the slave is ready; this is shown schematically with the twelfth step 565.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for automated updating of a communication unit of a control unit of a vehicle, the method comprises:
   providing the control unit of the vehicle, the control unit comprising:
   a plurality of software clusters, each software cluster is an independent software unit having at least one software component, a manifest, and a local runtime environment, each software cluster executes a functionality of the control unit associated with a device;
   the communication unit includes a dedicated manifest and a configuration table, the communication table includes an assignment of individual software clusters of the plurality of software clusters to each other and corresponding stored data flows; and
   a Multi Device Connector Routine;
   updating at least one of the software clusters, a plurality of the software clusters or adding/removing at least one software cluster;
   executing the Multi Device Connector Routine, wherein:
   at least the manifest of the updated software cluster, the updated software clusters or the at least one new software cluster is read in;
   at least one new manifest is generated for the communication unit by way of the read-in manifest; and
   at least one new configuration table is generated for the communication unit, wherein information provided to the control unit when updating the at least one software cluster is mapped within the configuration table; and flashing the at least one new manifest and the at least one new configuration table, thereby updating the communication unit of the control unit of the vehicle.

2. The computer-implemented method of claim 1, wherein the control unit comprises a plurality of virtual control units and each of the virtual control units in each case comprises a plurality of software clusters and a dedicated communication unit, wherein the communication between the software clusters of the dedicated virtual control unit and between the software clusters of the different virtual control units is handled by way of the communication units, and wherein at least one of the communication units is updated by way of executing the Multi Device Connector Routine.

3. The computer-implemented method of claim 2, wherein the control unit comprises a shared memory and the communication between the software clusters of the different virtual control units by way of the communication units is handled via the shared memory and the execution of the Multi Device Connector Routine is handled via the shared memory.

4. The computer-implemented method of claim 1, wherein the control unit is formed by a plurality of microcontrollers each forming a part of the control unit and comprising respectively at least a plurality of the software clusters and respectively the communication unit, wherein the communication between the software clusters within the respective microcontroller and between the software clusters of the different microcontrollers is handled by way of the communication units, wherein by way of executing the Multi Device Connector Routine at least one of the communication units is updated.

5. The computer-implemented method of claim 4, wherein each of the microcontrollers comprises a respective Multi Device Connector Routine, wherein by way of executing the respective Multi Device Connector Routine at least one of the communication units of the corresponding microcontroller is updated.

6. The computer-implemented method of claim 4, wherein the microcontrollers are connected to each other by way of a high-speed serial link, a LAN connection or by way of a bus system, and the communication between the software clusters is handled by way of the communication units via the high-speed serial link, the LAN connection or the bus system, and the execution of the at least one Multi Device Connector Routine is handled via the high-speed serial link, the LAN connection or the bus system.

7. The computer-implemented method of claim 1, wherein the control unit comprises an over-the-air interface and data are provided to the control unit by way of said over-the-air interface, wherein updating at least one of the software clusters, a plurality of the software clusters or adding at least one new software cluster is performed by way of the data provided thereby.

8. The computer-implemented method of claim 1, wherein updating at least one of the software clusters, a plurality of the software clusters or adding of at least one new software cluster and/or executing the Multi Device Connector is performed in dependence on safety/security-relevant and/or time-relevant events.

9. The computer-implemented method of claim 1, wherein the communication unit is updated depending on a safety level and/or a security level.

10. The computer-implemented method of claim 1, wherein components of the device are controlled and/or input data from sensors of the device are evaluated by way of the software clusters.

11. The computer-implemented method of claim 10, wherein, by way of the device, a vehicle or a part of a vehicle is controlled and/or the input data from sensors of the vehicle are evaluated.

12. A control unit supported by a vehicle for automated updating of a communication unit, the control unit comprising:

a microcontroller comprising a plurality of software clusters, each software cluster is an independent software unit comprising at least one software component, a manifest and a local runtime environment, wherein the communication unit provides communication between the software clusters, wherein the control unit executes the method of claim 1.

* * * * *